United States Patent [19]

Iizuka et al.

[11] Patent Number: 4,736,249

[45] Date of Patent: Apr. 5, 1988

[54] FACSIMILE TRANSMISSION CONTROL SYSTEM

[75] Inventors: Yoshio Iizuka, Kawasaki; Shigeo Matsunaga, Yokohama, both of Japan

[73] Assignee: Fujitsu Limited, Kawasaki, Japan

[21] Appl. No.: 606,834

[22] PCT Filed: Aug. 30, 1983

[86] PCT No.: PCT/JP83/00280

§ 371 Date: Apr. 23, 1984

§ 102(e) Date: Apr. 23, 1984

[87] PCT Pub. No.: WO84/01075

PCT Pub. Date: Mar. 15, 1984

[30] Foreign Application Priority Data

Aug. 30, 1982 [JP] Japan ................. 57-150383

[51] Int. Cl.[4] .............................. H04N 1/32
[52] U.S. Cl. ...................... 358/257; 358/264
[58] Field of Search ............... 358/256, 257, 264, 265

[56] References Cited

U.S. PATENT DOCUMENTS

| 3,614,319 | 10/1971 | Krallinger et al. | 358/257 |
| 4,000,371 | 12/1976 | Ogawa | 358/257 |
| 4,153,916 | 5/1979 | Miwa et al. | 358/257 |
| 4,274,114 | 6/1981 | Kozima | 358/257 |

FOREIGN PATENT DOCUMENTS 3017938 11/1980 Fed. Rep. of Germany .
51-36010 3/1976 Japan .

OTHER PUBLICATIONS

Japan Telecommunications Review, vol. 21, No. 3 (Jul.-1979), pp. 218-224, Tokyo, Japan: M. Orii et al.: "A New Model Small-Size Facsimile-Mini Fax-".
E.P.C. Search Report in App. #EP83902699.

Primary Examiner—Edward L. Coles, Sr.
Attorney, Agent, or Firm—Staas & Halsey

[57] ABSTRACT

A facsimile transmission control system comprising a transmitting side and a receiving side facsimile device, characterized in that the transmitting side facsimile device transmits a calling signal for calling the receiving side facsimile device, when the transmitting side receives a response signal indicating a receiving function and a completion of receiving preparation transmitted from the receiving side within a predetermined term after the transmitting side transmits the calling signal, the transmitting side transmits, in succession, a control signal indicating a transmitting function and an image data to the receiving side, meanwhile, when the transmitting side does not receive the response signal indicating the receiving function and the completion of receiving preparation transmitted from the receiving side within a predetermined term after the transmitting side transmits the calling signal, the transmitting side transmits the control signal indicating the transmitting function.

8 Claims, 13 Drawing Sheets

TRAINING NG

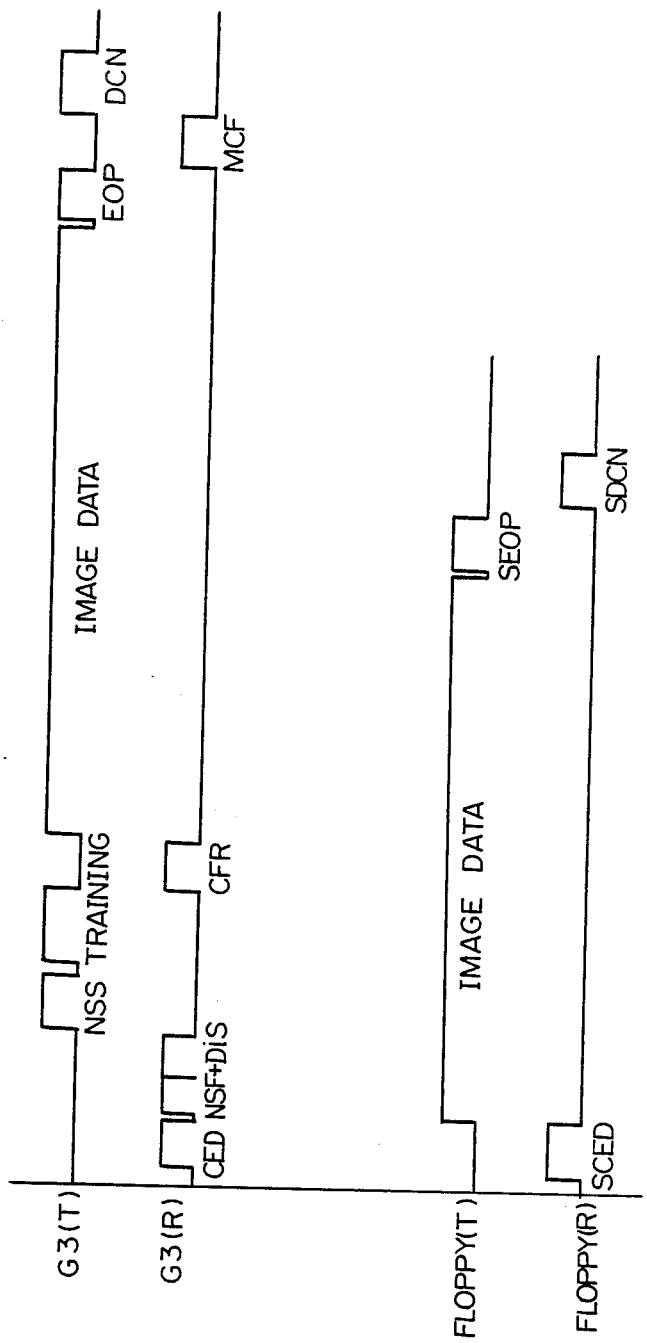

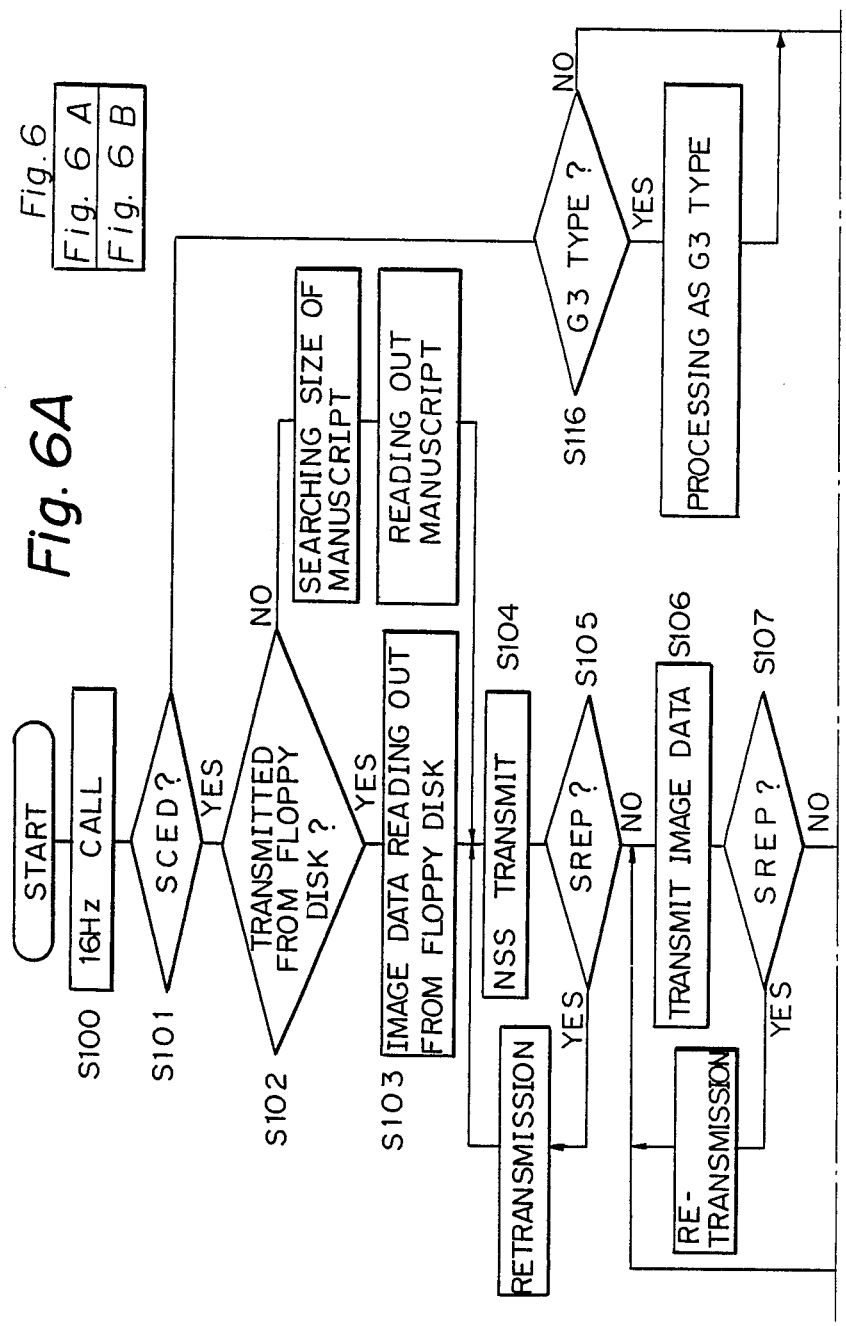

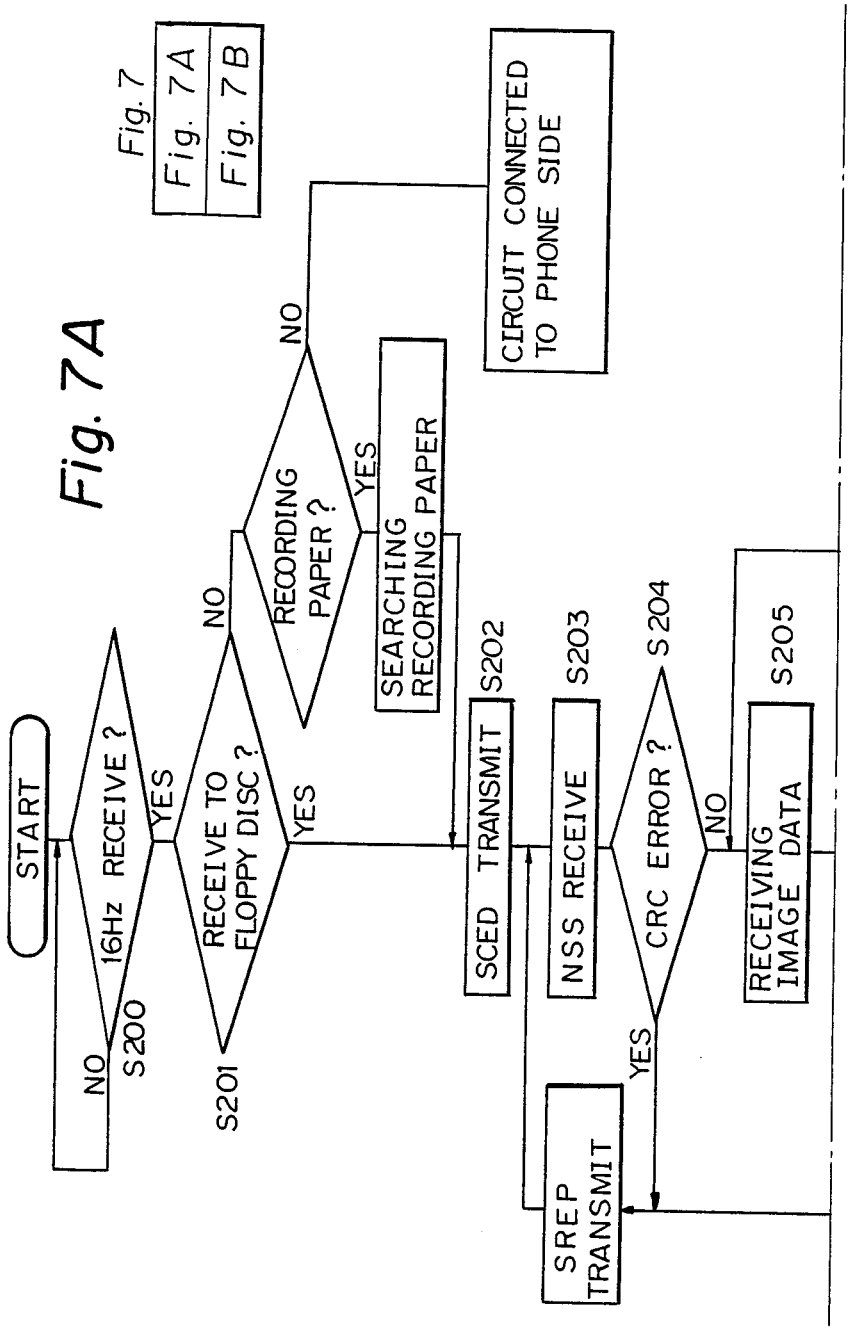

FACSIMILE TRANSMISSION CONTROL SYSTEM

BACKGROUND OF THE INVENTION

1. Field of the Invention

The present invention relates to a transmission control system used in a facsimile transmission system, more particularly, to a transmission control system having different and improved control codes which are necessary during the transmission so that it achieves a shortened transmission time.

2. Description of the Related Art

Conventional standard high-speed facsimile transmissions have been performed by using G3 transmission control procedures based on CCITT recommendations. The T.30 transmission control procedure used in G3 consists of a control code portion or division transmitted at a transmission speed of 300 bps (bits per second), an image data portion or division transmitted at a transmission speed of 9600 bps. In such a transmission method, the image data division is used with an MR data compression method, and the transmission time is shortened by enlarging the K parameter (insertion pitch of the MR data compression method). However, since this transmission method cannot shorten the transmission time of the control code division, the control division limits the facsimile transmission speed.

FIGS. 1(a) to 1(d) illustrate the operation procedure based on the conventional G3 procedure. FIG. 1(a) shows the normal operation procedure, FIG. 1(b) shows an end procedure for an abnormal operation caused by the failure of the training, and FIG. 1(d) shows a data retransmitting operation procedure caused by the occurrence of many errors in the image data. These operations are explained briefly hereinafter. In the drawings, the wavy arrow mark indicates the tonal signal (sine wave signal, 2100 Hz in the G3 procedure), and the straight arrow mark indicates the command code or response code according to the series code method based on a transmission speed of 300 bps. Moreover, the slanted or hatched arrow marks indicate the transmission of the image data based on a transmission speed of 9600 bps. Reference letter "S" indicates the transmission side of the facsimile system, and "R" indicates the receiving side.

(a) Normal operation procedure

When the 16 Hz calling signal is transmitted from the S side to the R side, the R side responds to the S side with the 2100 Hz tonal signal CED. In succession, the R side responds to the S side using the response code NSF.DIS (NSF indicates a non-standard procedure) indicating the receiving function such as paper size, compression method, and recording speed using a transmission speed of 300 bps. The S side transmits the command code NSS or DCS (where NSS indicates the non-standard operation, and DCS indicates the standard operation) as the control signal indicating the transmitting function and, in succession, the S side switches the modem from 300 bps to 9600 bps, and transmits the training data having an "0" signal for the predetermined term or time period. In the R side, when the training data is received as the normal "0" signal, the R side transmits the response code CFR, indicating completion of the preparations for receiving. According to the response code CFR, the S side transmits one page's amount of the image data using the 9600 bps transmission speed and, in succession, it transmits the command code MPS indicating continuation to the next page. In this case, since the image data is normally received by the R side, the R side responds to the S side using the response code MCF, indicating normal reception. The S side transmits the image data of the next page and the command code EOP indicating the end of the page to the R side. When the R side confirms normal reception of the image data, the R side responds to the S side with the response code MCF, and the S side transmits the command code DCN, indicating the disconnection of the circuit and the end of transmission.

(b) Abnormal operation procedure

When the image data has been transmitted from the S side to the R side, if the R side cannot normally receive the image data because it has run out of receiving paper, the R side responds to the S side with the response code PIN, indicating an abnormal condition at the terminal. The S side transmits the response code PRi-EOP or PRi-MPS requesting an operator call on the R side, and outputs an alarm by using the operator call, to indicate an abnormal condition, and again transmits the response code DCN, indicating the disconnection of the circuit and the end of the transmission.

(c) Retraining operation procedure caused by failure of the training

When the training data cannot be received normally by the R side, the R side responds to the S side with the response code ETT, indicating failure of the training, and the S side again transmits the training data. When the training data is received normally by the R side, the R side responds to the S side with the response code CFR, indicating completion of the preparations for receiving, and after this time, the normal operation procedure shown in item (a) is performed between the S side and the R side.

(d) Retransmitting operation procedure caused by the occurrence of many errors in the image data When the image data received by the R side contains errors over a predetermined amount, the R side responds to the S side with the response code RTN. The S side changes the transmission speed of the image data of the next page from 9600 bps to 7200 bps, and informs the R side using the command code NSS, indicating a non-standard operation. After that, the S side again transmits the training data to the R side, and the R side performs the normal operation procedure shown in item (a) after responding to the S side using the response code CFR.

As mentioned above, the conventional G3 procedure is performed by exchanging many different command codes and response codes at a low transmission speed of 300 bps, therefore, the necessary time for transmitting these codes takes several tens of seconds, and takes about one-sixth of the overall transmission time. Moreover, the conventional G3 procedures have problems, in that it is necessary to have training time of from 1 to 2 seconds, and the retransmission when many errors occur is performed after complete transmission of one pages amount of image data, so that considerable transmission time is wasted.

SUMMARY OF THE INVENTION

An object of the present invention is to simplify the transmission control procedure used in a facsimile transmission system by using improved command codes and response codes which can decrease the exchange of these codes as compared with the conventional transmission control procedure, thereby shortening the transmission time, and achieving a high-speed facsimile transmission.

In accordance with the present invention, in a facsimile system, the transmitting side facsimile transmits the calling signal in order to call the receiving side facsimile. After transmitting the calling signal, when the transmitting side receives the response signal indicating completion of the receiving side within a predetermined time, the transmitting side transmits the control signal indicating a transmitting function and, in succession, transmits the image data to be transmitted to the receiving side. When the transmitting side does not receive the response signal from the receiving side within the predetermined time, the transmitting side transmits again only the control signal to the receiving side.

In accordance with the present invention, it is possible to considerably simplify the transmission control procedure without interfering with the performance of the facsimile system. Moreover, it is possible to shorten the transmission time to five to six seconds compared with the conventional six to fifteen seconds of transmission time, thereby performing a high-speed facsimile transmission. Moreover, since there is less load on the hardware and software, communication costs can be decreased considerably and there is a large beneficial economical effect.

BRIEF DESCRIPTION OF THE DRAWINGS

FIG. 5 is a waveform chart of signal timing used in a facsimile transmission procedure of the present invention compared with the waveform of a conventional procedure; and FIGS. 6a–b and 7a–b are flowcharts of the transmission control procedure of the device shown in FIG. 3.

DESCRIPTION OF THE PREFERRED EMBODIMENTS

Hereinafter, a facsimile transmission control system according to an embodiment of the present invention will be explained in detail using the accompanying drawings.

Figure 1A:
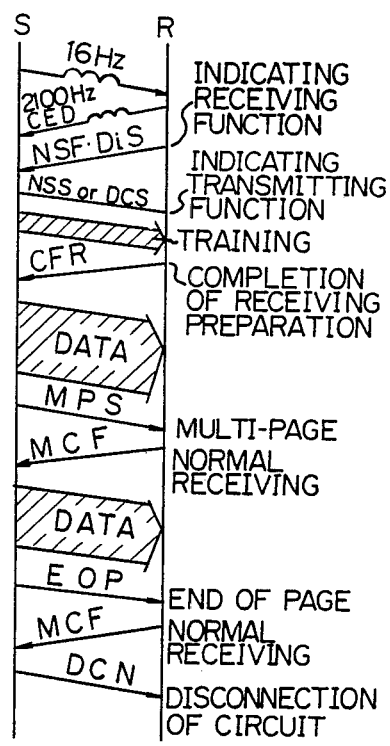
FIGS 1(a) to 1(d) are signal transmission diagrams of a facsimile transmission control procedure according to the conventional G3 transmission procedure.
Figure 1B:
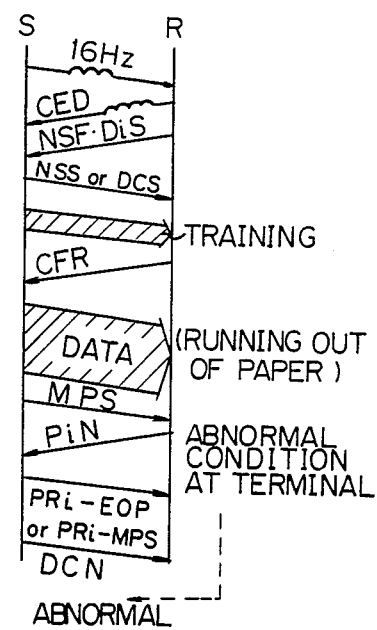
Figure 1C:
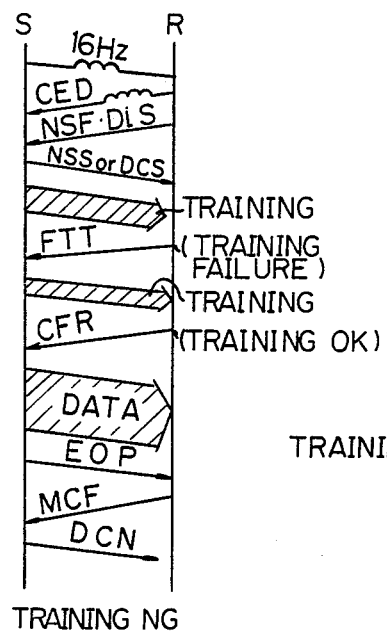
Figure 1D:
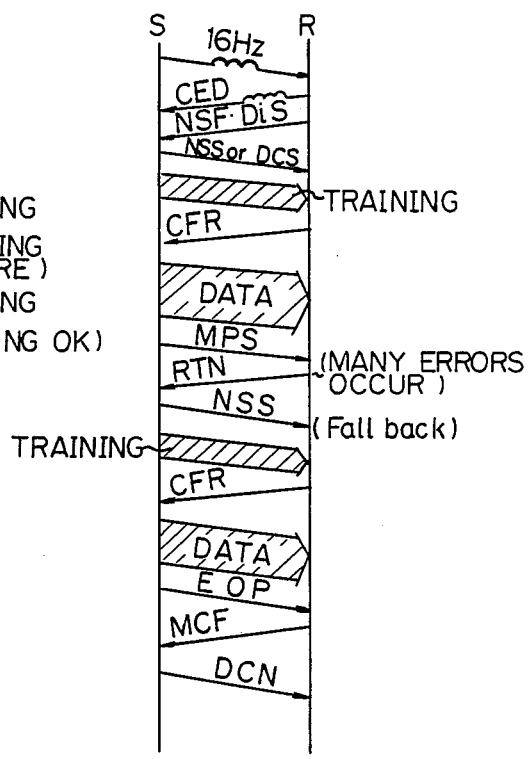
Figure 2:
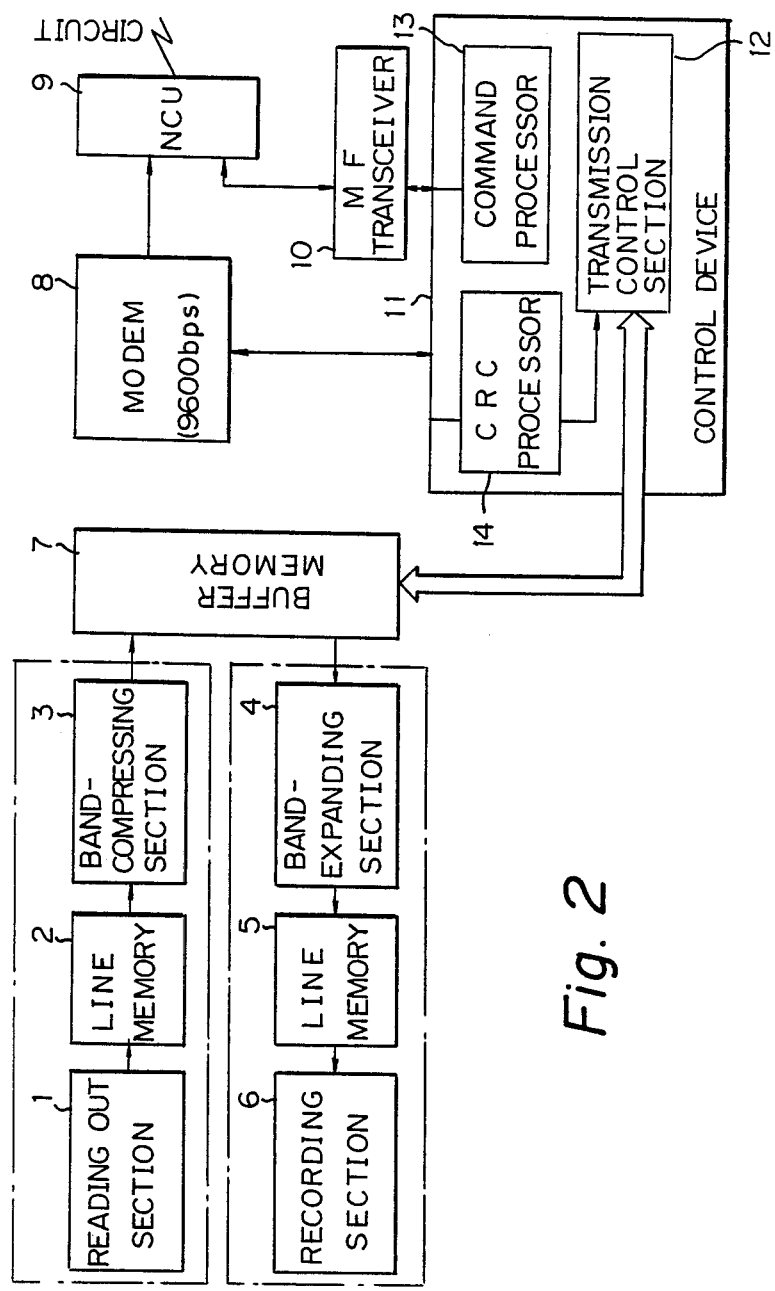
FIG. 2 is a schematic block diagram of a facsimile system according to an embodiment of the present invention.

Referring to FIG. 2, a transmitting reading section indicated by a chain dotted line comprises a reading section 1, a line memory 2, and a band-compressing section 3; and a receiving recording section indicated by a chain dotted line comprises a band-expanding section 4, a line memory 5, and a recording section 6. The reference numeral 7 indicates a buffer memory, 8 a modem, 9 a network control unit (NCU), 10 an MF transceiver, 11 a control device, 12 a transmission control section, 13 a command processor, and 14 a cyclic redundancy check processor (CRC). Each component shown by reference numerals 1 to 6 is the same component as in a conventional facsimile transmission control system.

Figure 3A:
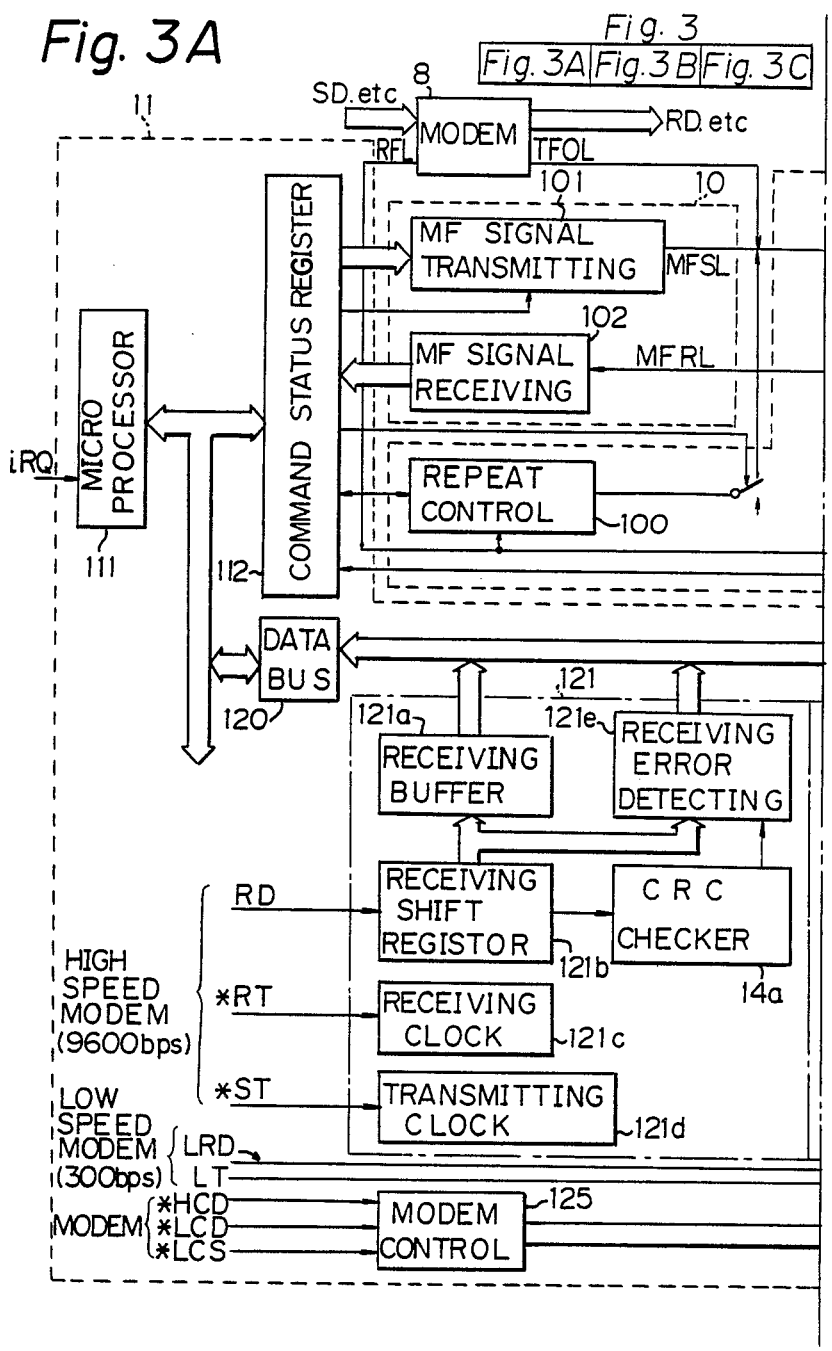
FIG. 3, including 3A–3C, is a more detailed block diagram of a network control unit, a multifrequency (MF) transceiver, and a control device as shown in FIG. 2.
Figure 3B:
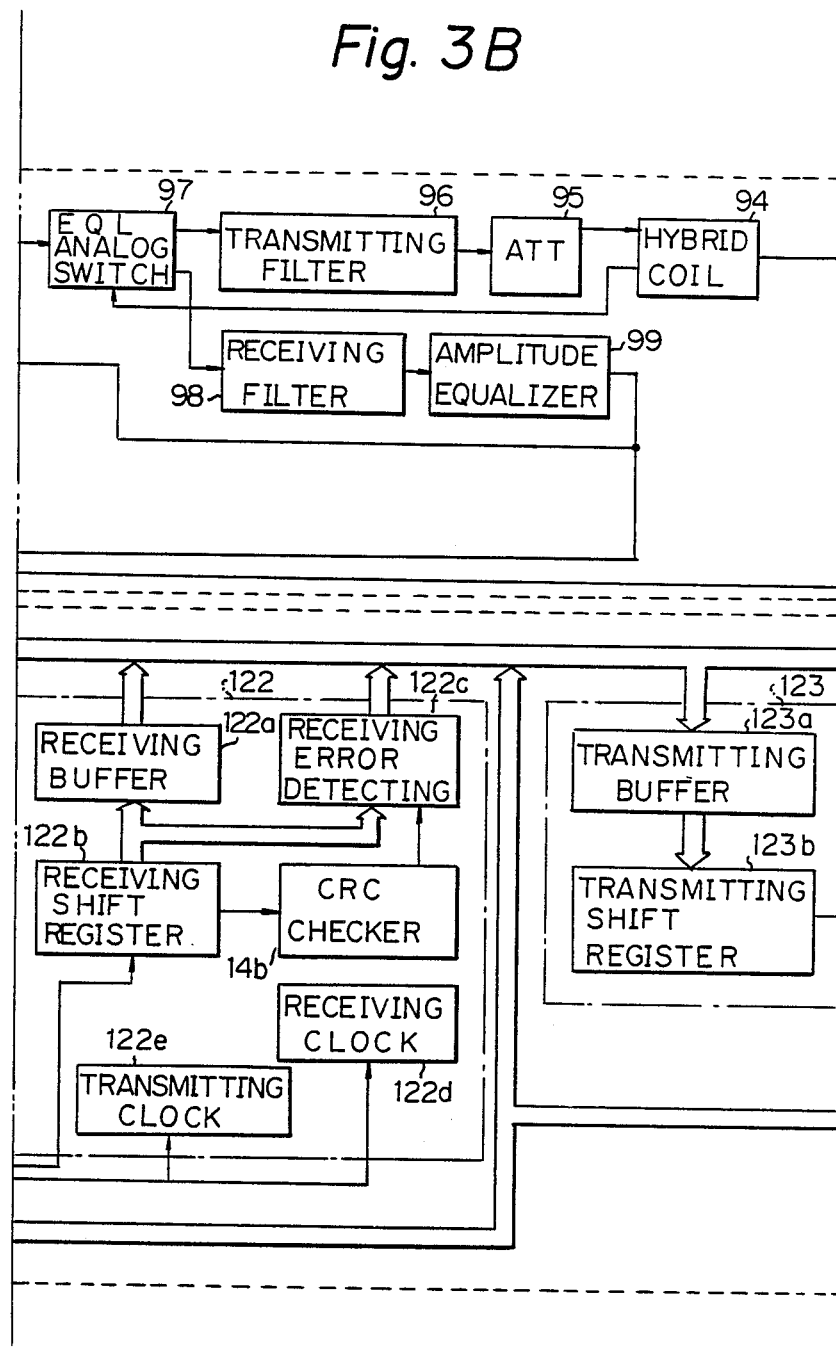
Figure 3C:
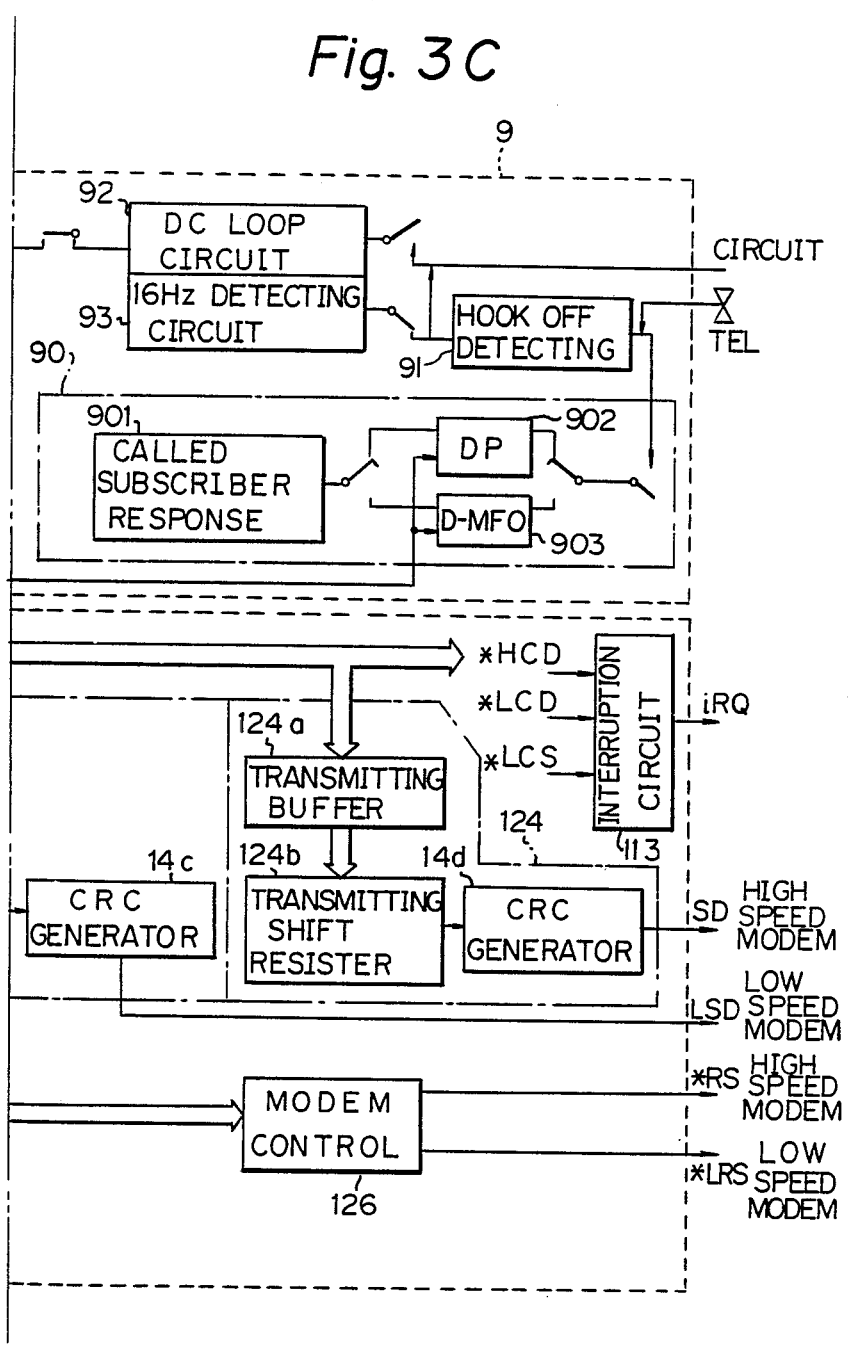

Referring to FIG. 3, the network control unit 9 comprises an hook-off detecting circuit 91, a DC loop circuit 92, a 16 Hz detecting circuit 93, a hybrid coil 94, an attenuator (ATT) 95, a transmission filter 96, an EQL analog switch 97, a reception filter 98, an amplitude equalization circuit 99, a repeat control 100, and an automatic dialing section 90 comprising a called subscriber response detecting circuit 901, DP 902 and D-MFO 903.

The MF transceiver 10 comprises an MF signal transmitting section 101 and a MF signal receiving section 102.

The control device 11 comprises a command processor 13 including a microprocessor 111, a command status register 112 and an interruption circuit 113; a CRC processor 14 comprising high speed and low speed CRC checkers 14a, 14b, and high speed and low speed CRC generators 14c, 14d; and a transmission control section 12 comprising high speed (9600 bps) and low speed (300 bps) receiving buffers 121a, 122a, receiving error detecting sections 121e, 122e, receiving shift registers 121b, 122b, receiving clocks 121c, 122d, transmitting clocks 121d, 122e, transmitting buffers 123a, 124a, transmitting shift registers 123b, 124b, and modem controls 125 and 126.

In accordance with these structures, the present invention will be explained in more detail with reference to FIGS. 2 and 3.

The buffer memory 7 is a memory for storing temporarily the compressed and coded image data, and it can store the image data transmitted from the band-compressing section 3 based on the image data read from the reading section 1, or can store the image data received from the other facsimile system of one page in amount. The control of the buffer memory 7 is performed by the transmission control section 12.

The modem 8 can control the switching to a high-speed transmission (9600 bps) or a low-speed transmission based on a high carrier detecting signal (*HCD, *: negative logic), a low carrier detecting signal (*LCD), and a low clear-to-sent signal (*LCS), where these signals are transmitted from the receiving side facsimile; and can transmit the transmitting data (SD) from the buffer memory 7 to the network, or transmit the received data (RD) from the network to the buffer memory 7, using a 9600 bps transmission speed when controlled for high speed transmission.

In the network control unit (NCU) 9, the automatic dialing section 90 is activated by operating the keyboard provided in the operating panel (not shown) based on control of the microprocessor 111, and the receiving side facsimile is called using the 16 Hz calling signal using a push-button-phone or dial phone. The receiving side facsimile responds to the transmitting side facsimile using the response signal (SCED) indicating the receiving function and the completion of the receiving preparation task if the receiving side facsimile is provided with a facsimile system according to the present invention. The signal SCED is transmitted to the MF type signal receiving section 102 of the MF transceiver 10 as the MFRL signal via the hybrid coil 94 for switching transmitting/receiving using the half duplex transmission method, the EQL analog switch 97, the receiving filter 98, and the amplitude equalization circuit 99 for equalizing the delay time. As mentioned above, NCU 9 has functions such as the control of connecting or disconnecting the network to the receiving side facsimile, and automatic dialing of the remote terminal.

MF transceiver 10 comprises an MF signal transmitting section 101 and MF signal receiving section 102, and transmits the MFSL signal after converting a command (except for NSS) sent by the command processor 13 to an MF type signal, and receives the response or command (except for NSS) of the MF type signal as MFRL signal, and applies these signals to the command processor 13 controlled by the microprocessor 111. The MF signal comprises a composite signal consisting of a plurality of single tones each having a different frequency, and is selected as one kind of each high and low frequency band from within three kinds of high frequency bands and four kinds of low frequency bands.

The command processor 13 generates the following signals as the response signal, i.e., SCED (indicates four sets of signals, for example, paper size A4 or B4 as receiving paper size, floppy disk or paper as receiving medium type), SMPS (multi pages), SEOP (end of page), SMCF (normal receiving), SPiP (end of paper, running out of paper), SPiN (abnormal receiving at terminal), SDCN (circuit disconnect), and SREP (request for retransmission). The processor 13 supplies the command code or response code corresponding to the receiving side to the receiving side facsimile according to the control condition of the transmission control section 12, and, moreover, indicates the type of signal received based on the command or response code transmitted from the receiving side to the transmission control section 12. The transmission control section 12 is provided with a receiving section 121 for the high speed modem, a receiving section 122 for the low speed modem, a transmitting section 123 for the low speed modem, and a transmitting section 124 for the high speed modem. The control section 12 is provided with CRC checkers 14a, 14b for error detecting and error correcting of every frame received in the receiving sections 121, 122, and CRC generators 14c, 14d for adding a CRC code to data transmitted in the transmitting section 123, 124. The transmission control section 12 of the receiving side will not respond to the SCED signal within a predetermined term (for example, within 3 seconds) if it is a conventional type facsimile system or another firm's product. In such a situation, the control section 12 of the transmitting side applies the low speed received data (LRD) signal at 300 bps and the low timing (LT) signal to its receiving section 122, at the same time, a low carrier detect (*LCD) and low clear-to-send (*LCS) signals are applied to the modem control section 125 and the interruption circuit 113. The interruption circuit 113 supplies the interrupting signal iRQ to the microprocessor 111 indicating an abnormal condition on the receiving side. The microprocessor 111 controls the receiving section 122 and the transmitting section 123 according to the iRQ signal, and determines that the receiving side is a conventional facsimile or another firm's product, and transmits signals to the receiving side based on the conventional G3 transmission procedure. Of course, if the receiving side uses a facsimile system according to the present invention, a SCED signal is transmitted from the transmitting side to the receiving side, and transmitted to the command status register 112 via NCU 9 of the receiving side. The command status register 112 controls the modem 8 and NCU 9 based on the binary data obtained from the MF signal receiving section 102, and the microprocessor 111 controls the transmission procedure based on this binary data. As mentioned above, all command and response codes, except for NSS, are transmitted and received by the MF transceiver 10. An NSS command is transmitted by transmitting it together with the transmitting of the image data in the transmission control section 12 when it is transmitted, and is separated from the received message when it is received.

The CRC processor 14 generates the CRC code (cyclic redundancy check code) and adds the CRC code to the image data whenever the processor 14 transmits the image data divided into frame units (for example, 1 k byte), and performs an error check of the image data for every frame unit based on the CRC code whenever the processor 14 receives the image data. If the processor 14 detects a data error, the data error is communicated to the transmission control section 12, which transmits a request for retransmission of the same frame (transmits command SREP). According to the above-mentioned procedure, the retraining based on conventional G3 procedure is not necessary.

Figure 4A:
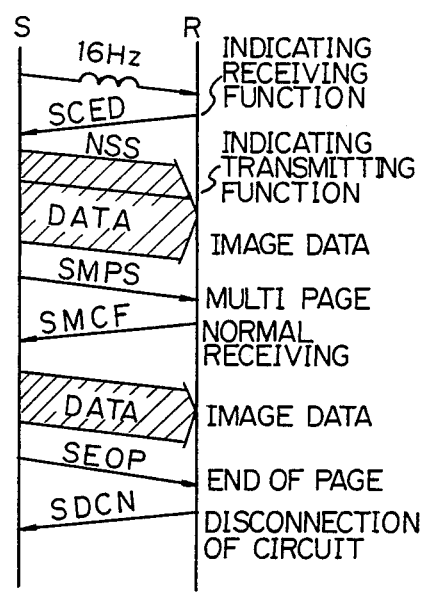
FIGS. 4(a) to 4(e) are signal transmission diagrams of a facsimile transmission control procedure according to an embodiment of the present invention.
Figure 4B:
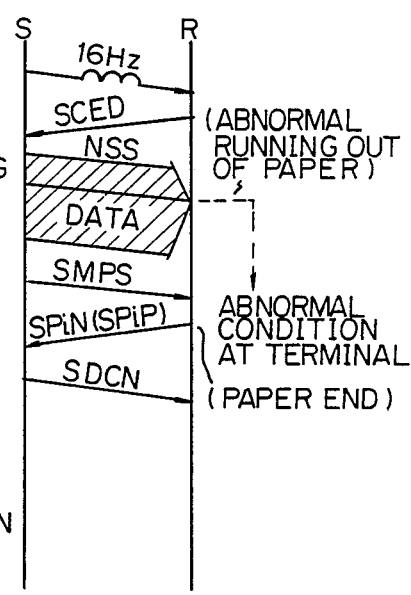
Figure 4C:
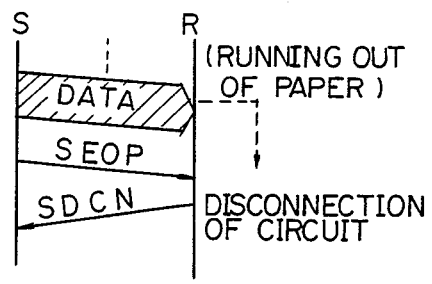
Figure 4D:
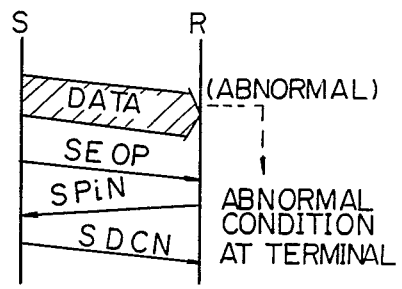
Figure 4E:
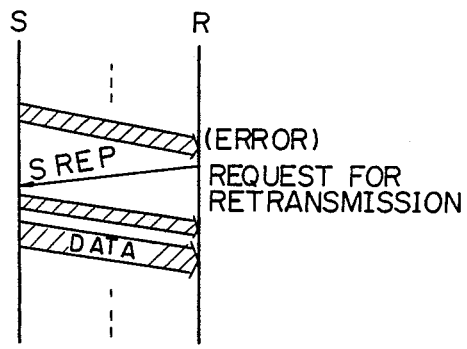

Referring to FIG. 4(a) to 4(e), FIG. 4(a) shows a normal operation procedure, FIG. 4(b) shown an abnormal operation procedure for the terminal during the transmission of the first page in the multi-page transmission, FIG. 4(c) shows the end procedure for the abnormal operation caused by running out of receiving paper during the transmission of the final page in the multi-page transmission, FIG. 4(d) shows an abnormal end operation procedure during the transmission of the final page, and FIG. 4(e) shows the data retransmitting operation procedure caused by the occurrence of many errors in the image data. In the drawings, as mentioned in FIG. 1, the wavy arrow mark indicates the tonal signal, the slanted or hatched arrow marks indicates data transmission based on the transmission speed of 9600 bps, and the straight arrow mark indicates the command code or response code based on the multifrequency (MF) signal. The reference letter "S" shows the transmitting side of the facsimile system, and "R" shows the receiving side of the facsimile system.

(a) Normal operation procedure

When the 16 Hz calling signal is transmitted from the S side to the R side, the R side responds to the S side using the response code SCED, indicating the setting of the circuit, and the receiving functions for the paper size (A4 or B4) and the receiving medium type (floppy disk or paper) with an MF signal type. The S side transmits the command code NSS indicating the transmitting function and, in succession, transmits the image data (DATA) without training after adding the check bit to every frame of the image data. The command code NSS is transmitted at the transmission speed of 9600 bps the same transmission speed as that for the image data using the series code method. For this reason, the facsimile system is provided with means for controlling and discriminating the image data and the command code NSS based on a predetermined format (for example, a first frame is the command code NSS). Alternatively, it is possible to transmit NSS using an MF signal type. When the image data is normally received by the R side, the response code SREP for requesting retransmission does not get transmitted from the R side, and the S side determines that normal transmission is occurring and continues to transmit a one page amount of the image data one frame at a time. After a one page amount of the image data has been transmitted, the S side transmits command code SMPS when multi-pages are to be transmitted. The R side responds to the S side using the response code SMCF, indicating normal receiving. The S side transmits the image data for the next page, and transmits the command SEOP if the image data of the next page is the final page and transmits the command SMPS if the image data of the next page is a middle page. When the R side detects the command SEOP, the R side responds to the S side using the response code SDCN, indicating disconnection of the circuit. The R side can disconnect the circuit without the circuit disconnection command transmitted from the S side.

As mentioned above, the response code SCED according to the present invention has both functions indicating the response code NSF,DIS for the receiving function and the response code CFR for the completion of receiving preparation which the conventional G3 transmission procedures include. Moreover, the command code SEOP has both functions indicating the command code EOP for end of the page and the command code SCDN for disconnection of the circuit which the conventional G3 transmission procedures include. It is possible, with the present invention, to simplify the total transmission procedure by eliminating the training procedure.

(b) Abnormal operation or running out of paper at the receiving terminal during transmission of the first page When the S side transmits the first page of the multi-page document, if the R side incurs an abnormal condition of the terminal or runs out of receiving paper, the R side responds to the S side using either the response code SPiN, indicating abnormal condition of the terminal, or the response code SPiP, indicating out of receiving paper, corresponding to the multi-page command SMPS transmitted from the S die, and the R side waits for the command SDCN indicating disconnection of the circuit transmitted from the S side, and the R side can disconnect the circuit itself. Meanwhile, when the R side incurs an abnormal condition of the terminal or runs out of receiving paper during transmission of the final page, the R side responds to the S side by SDCN or SPiN as discussed in (c) and (d) below, and this response is different from the (b) procedure because the S side discriminates the kind of abnormal condition based on these command codes.

(c) Running out of the receiving paper during transmission of the final page

In this case, the R side responds to the S side using the response code SDCN as the response to the command SEOP indicating end of page as shown in (a), and disconnects the circuit.

(d) Abnormal condition of the terminal during transmission of the final page

In this case, the R side responds to the S side using the response code SPiN indicating an abnormal condition at the terminal shown in (b) as the response to the command SEOP indicating the end of the page, and disconnects the circuit after the R side receives the command SDCN transmitted from the S side.

(e) Retransmission when the image data contains errors

As mentioned above, the image data is transmitted in frame units. The size of each frame is determined by the generation ratio of the data errors and the size of the K parameter, i.e., the compression ratio of the data, if many data errors occur, each frame and the compression ratio is small and in an extreme case, one frame is one line. Normally, when the compression ratio is large, the size of each frame is generally selected to be about 1 K byte. When the R side detects the errors in a frame which is received, the R side responds to the S side with the response code SRIP, indicating a request for retransmission. The S side retransmits the image data after the data starting position for transmission is backed up by one frame. The S side continues to successively transmit the frame units until the R side responds to the S side by the response code SREP.

When the R side detects the data error, the error detection of the R side is performed by a conventional CRC method of error detection. Constitution and control of a page based on each frame are also performed by conventional transmission techniques.

As mentioned above, the command and response code, according to the embodiment of the present invention are transmitted by an MF type transmission signal. Analysis and control of the response code and generation of the command code are performed by the transmission control section 12 as in a conventional facsimile system.

Referring now to FIG. 5, the upper part of the drawing indicates the waveforms according to the embodiment of the present invention. As can be seen from each waveform, in the case of the present invention, the starting procedure is considerably simplified. Moreover, since the image data also has the retransmitting function using the separated transmission method for every frame unit, the image data is allowed to have an unlimited K parameter for the MR data compression method, and the compression ratio of the data is considerably improved. As a result, the total transmission time can be shortened by approximately half of the conventional G3 transmission time.

Figure 6B:
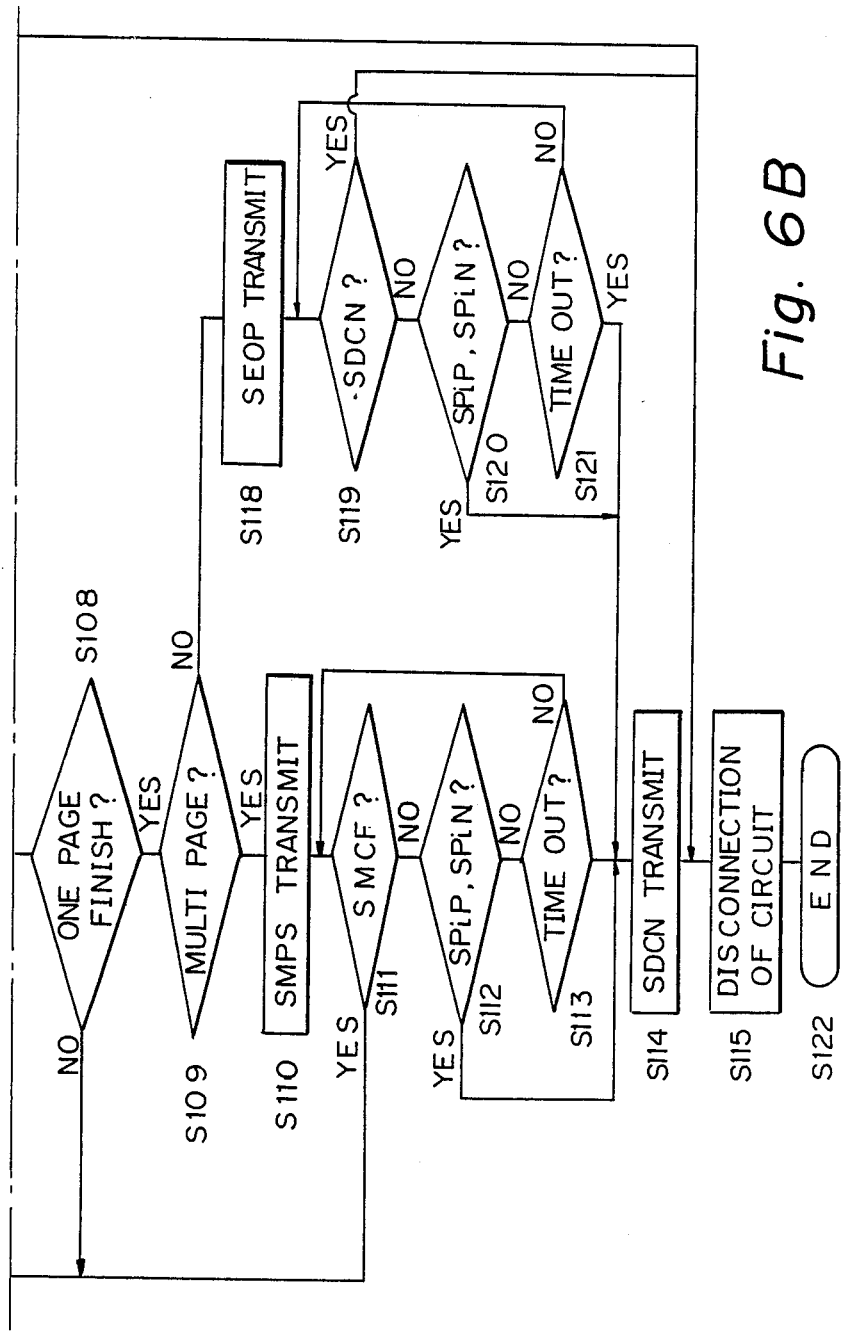
Figure 7B:
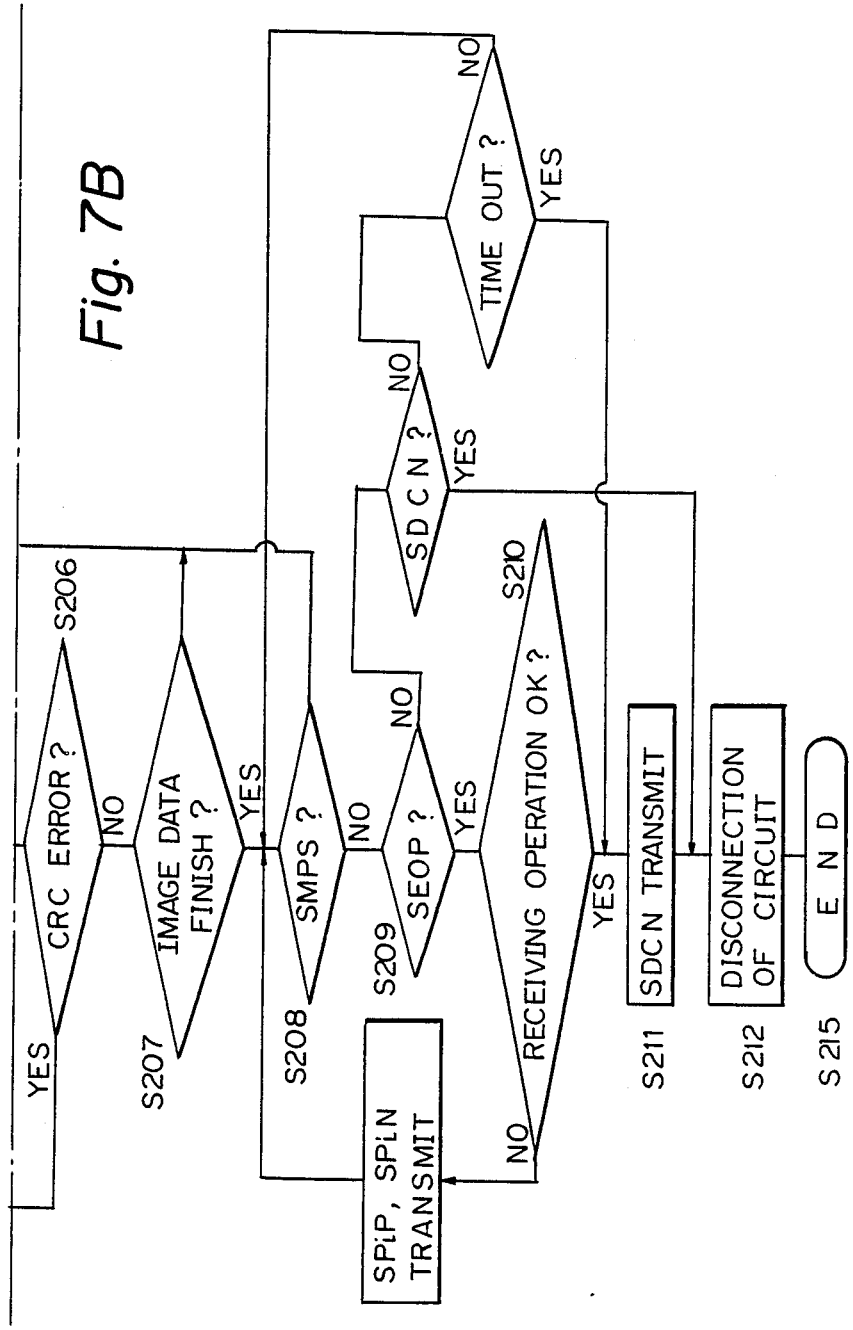

FIGS. 6 and 7 are flowcharts of the transmission control procedure of the device shown in FIG. 3. FIG. 6 is the flowchart of the transmitting side, and FIG. 7 is the flowchart of the receiving side facsimile system.

Referring to FIG. 6, the transmitting side (s) facsimile system transmits the 16 Hz calling signal (S100), waits for the response signal SCED from the receiving side (R) facsimile system, and determines whether the response signal from the R side is within the predetermined time period (for example, within 3 seconds) (S101). If the R side facsimile system is a conventional type (G3 type), the transmission control section 12 selects the low speed modem, and the data is processed by the receiving section 122 and the transmitting section 123, as the conventional G3 type facsimile system (S116, S117). The S side determines whether the R side is used with the floppy disk or with paper (S102). In the case of the floppy disk, the S side commands the reading of the image data from the floppy disk (S103). Next, the S side transmits the command code NSS indicating a transmitting function of a non-standard operation (S104) and, in succession, transmits the image data (DATA) (S106), but if errors occur in the R side, the R side responds to the S side with the response code SREP (S105), the S side again transmits the command code NSS during the retransmission process (S104). During the transmission of image data, if the response code SREP is the response from the R side (S107), the S side transmits again from the frame in which the errors occurred. As the result, since the S side does not retransmit after finishing all of one pages amount of the image data transmission, it is possible to shorten the transmission time. When the transmission of a one page amount of data is finished, the S side transmits the command code SMPS indicating the multi-page (S110), the R side responds to the S side using the response code SMCF when the R side can receive normally (S111). If the abnormal condition occurs on the R side, the R side responds to the S side using the response code SPiP or SPiN indicating an abnormal condition at the terminal (S112). Meanwhile, when the transmission is finished with one page, the S side transmits the command code SEOP, indicating the end of page (S118), the R side responds to the S side using the response code SDCN, indicating disconnection of the circuit in a normal receiving condition (S114, S119).

Referring to FIG. 7, after the 16 Hz calling signal is received by the R side (S200), the R side judges whether receiving is to use a floppy disk or paper (s201), and the response code SCED is transmitted to the S side (S202). The command code NSS transmitted from the S side is received by the R side (S203), the R side determines whether CRC errors are contained in the frame (S204) and in succession, the image data is received by the R side (S205). When errors occur in the image data, the request for the retransmission of the frame in which the errors occurred is transmitted to the S side (S206), and the S side again transmits the frame to be retransmitted after the command code NSS is transmitted to the R side (S203). When the transmission of the frames of a one page amount is finished (S207), the response code SMPS indicating whether it is multi-page or not (S208) is transmitted, and when the transmission is finished, the command code SEOP, is transmitted by the S side (S209), the R side responds to the S side using the response code SDCN, indicating the disconnection of the circuit (S211). When the terminal runs out of the paper, or an abnormal condition of the terminal occurs, the response code SPiP or SPiN is transmitted to the S side, the R side responds to the S side using the response code SDCN indicating the disconnection of the circuit.

We claim:

1. A facsimile transmission control system, comprising:
    a transmitting side facsimile device and a receiving side facsimile device coupled to said transmitting side facsimile device, said transmitting side facsimile device comprising:
        means for transmitting a calling signal for calling said receiving side facsimile device;
        detection means for detecting a predetermined multi-frequency control code signal from said receiving side facsimile device;
        selection means for selecting a first mode or a second mode in dependence on detection by said detection means within a predetermined period of time;
        first mode transmitting means for transmitting to said receiving side facsimile device, at a first transmitting speed, a transmitting function signal and image data when the first mode is selected by said selection means; and
        second mode transmitting means for transmitting to said receiving side facsimile device, in succession at a second transmitting speed higher than the first transmitting speed, a multi-frequency control code signal indicating a transmitting function and the image data when the second mode is selected by said selection means.

2. A facsimile transmission control system as claimed in claim 1, wherein said transmitting side facsimile device further comprises a memory, said transmitting side facsimile device stores said image data in said memory, and when said transmitting side facsimile device receives said predetermined multi-frequency control code signal, said transmitting side facsimile device transmits, in succession, said multi-frequency control code signal indicating said transmitting function and said image data read from said memory.

3. A facsimile transmission control system as claimed in claim 1, wherein said transmitting side facsimile device and said receiving side facsimile device are coupled by a transmission line circuit, and said system further comprises:
    transmitting reading section means for reading out from a manuscript to be transmitted and for storing it temporarily and for band-compressing the manuscript to be transmitted;
    receiving recording section means for band-expanding the image data and for storing it temporarily and for recording it as a received manuscript;
    a buffer memory, operatively connected to said transmitting reading section means and said receiving recording section means, for storing the transmitted image data and the received image data;
    a modem for transmitting said image data from said buffer memory at a predetermined transmission speed;
    a network control unit, operatively connected to said modem and said transmission line circuit, for performing circuit connection and disconnection control, and automatic dialing;
    an MF transceiver, operatively connected to said network control unit, for converting a command code to a multi-frequency type signal; and
    a control device, operatively connected to said MF transceiver, said modem and said buffer memory, for correcting the error and for generating and processing a command code and a response code and for controlling the transmitting and receiving data.

4. A facsimile transmission system as recited in claim 1, wherein said receiving side facsimile device comprises:
    means for receiving said image data transmitted from said transmitting side fascimile device, and informing said transmitting side whether the received image data is normally received or not; and
    means for responding to said transmitting side facsimile device, when said receiving side facsimile device receives an end signal indicating the end of the transmitting of image data transmitted from said transmitting side, said receiving side responds to said transmitting side, with a signal indicating a disconnection of the circuit, and for disconnecting said circuit from said transmitting side facsimile device.

5. A facsimile transmission method, comprising:
    (a) transmitting a calling signal;
    (b) waiting a predetermined time period for a predetermined multi-frequency control code response signal;
    (c) selecting a first mode when the predetermined multi-frequency control code response signal is received within the predetermined period of time;
    (d) selecting a second mode when the predetermined multi-frequency control code response signal is not received within the predetermined period of time;
    (e) transmitting, at a first transmitting speed, a transmitting function signal and facsimile image data when in the first mode; and (f) transmitting, in succession at a second transmitting speed higher than the first transmitting speed, a multi-frequency control code transmission signal indicating a transmitting function and the facsimile image data when in the second mode 6. A method as claimed in claim 5, wherein step (e) includes transmitting separately the transmitting function signal when the multi-frequency control code response signal is not received within the predetermined period of time.

7. A method as recited in claim 5, wherein the first transmission speed is a Group III speed.

8. A system as recited in claim 1, wherein the first transmission speed is a Group III speed.

* * * * *

UNITED STATES PATENT AND TRADEMARK OFFICE
CERTIFICATE OF CORRECTION

PATENT NO. : 4,736,249
DATED : April 5, 1988
INVENTOR(S) : Yoshio Iizuka and Shigeo Matsunaga It is certified that error appears in the above-identified patent and that said Letters Patent is hereby corrected as shown below:

Column 2, line 28, "ETT," should be --FTT,--.

Column 4, line 11, "a MF" should be --an MF--.

Column 6, line 22, "shown" should be --shows--;
          line 30, "4(c)" should be --4(e)--.

Column 7, line 13, "NSF,DIS" should be --NSF.DIS--.

Column 9, line 14, "(s201)" should be --(S201)--.

Column 11, line 5, "mode" should be --mode.--.

Signed and Sealed this

Thirteenth Day of September, 1988

Attest:

DONALD J. QUIGG

*Attesting Officer*     *Commissioner of Patents and Trademarks*